(12) United States Patent
Feldman

(10) Patent No.: US 9,322,425 B1
(45) Date of Patent: Apr. 26, 2016

(54) INSTRUMENT CLIP

(71) Applicant: William Feldman, Milwaukee, WI (US)

(72) Inventor: William Feldman, Milwaukee, WI (US)

( * ) Notice: Subject to any disclaimer, the term of this patent is extended or adjusted under 35 U.S.C. 154(b) by 0 days.

(21) Appl. No.: 14/022,812

(22) Filed: Sep. 10, 2013

Related U.S. Application Data

(60) Provisional application No. 61/772,863, filed on Mar. 5, 2013.

(51) Int. Cl.
| | |
|---|---|
| *F16B 37/04* | (2006.01) |
| *F16B 2/22* | (2006.01) |
| *F16M 11/00* | (2006.01) |
| *G10G 5/00* | (2006.01) |

(52) U.S. Cl.
CPC ............... *F16B 37/043* (2013.01); *F16B 2/22* (2013.01); *F16M 11/00* (2013.01); *G10G 5/00* (2013.01)

(58) Field of Classification Search
CPC ......... G10G 5/00; F16B 37/041; F16B 37/02; F16B 37/042; F16B 37/0807; F16B 37/0857; F16B 37/043
USPC ................... 248/443, 230.7, 230.9, 300, 301; 211/85.6; 411/173, 182, 112, 520, 523, 411/433; 84/327, 329
See application file for complete search history.

(56) References Cited

U.S. PATENT DOCUMENTS

| | | | |
|---|---|---|---|
| 3,336,827 A | 8/1967 | Gaylor | |
| 3,426,817 A * | 2/1969 | Andrews | ............... F16B 37/043 411/173 |
| 3,994,198 A | 11/1976 | Herman | |
| 4,216,695 A | 8/1980 | Hoshino | |
| 4,365,535 A | 12/1982 | Buttner et al. | |
| 4,582,282 A * | 4/1986 | Gracie | ............... G10G 5/00 248/167 |
| 4,960,028 A | 10/1990 | Ramirez | |
| 6,191,347 B1 * | 2/2001 | Hoshino | ............... G10D 1/08 84/327 |
| 6,840,727 B1 * | 1/2005 | Vassiliou | ............... F16B 37/041 411/112 |
| 6,930,233 B2 | 8/2005 | Hsieh | |
| 7,176,368 B2 | 2/2007 | Takegawa | |
| 7,479,593 B1 | 1/2009 | Townsend | |
| 7,568,870 B2 * | 8/2009 | Paquet | ............... F16B 37/043 411/125 |
| 7,629,526 B1 | 12/2009 | Miyajima | |
| 8,237,039 B2 | 8/2012 | Crelin | |
| 8,240,964 B2 * | 8/2012 | Motsch | ............... F16B 37/043 411/112 |
| 2004/0094016 A1 | 5/2004 | Hallerberg | |

* cited by examiner

*Primary Examiner* — Todd M Epps
(74) *Attorney, Agent, or Firm* — Boyle Fredrickson, S.C.

(57) ABSTRACT

A musical instrument stand clip is provided including a resilient body having a central portion, a first end portion extending outwardly from the central portion and defining a first opening therein and a second end portion extending outwardly from the central portion and defining a second opening therein, wherein the first opening at least partially overlaps the second opening.

17 Claims, 11 Drawing Sheets

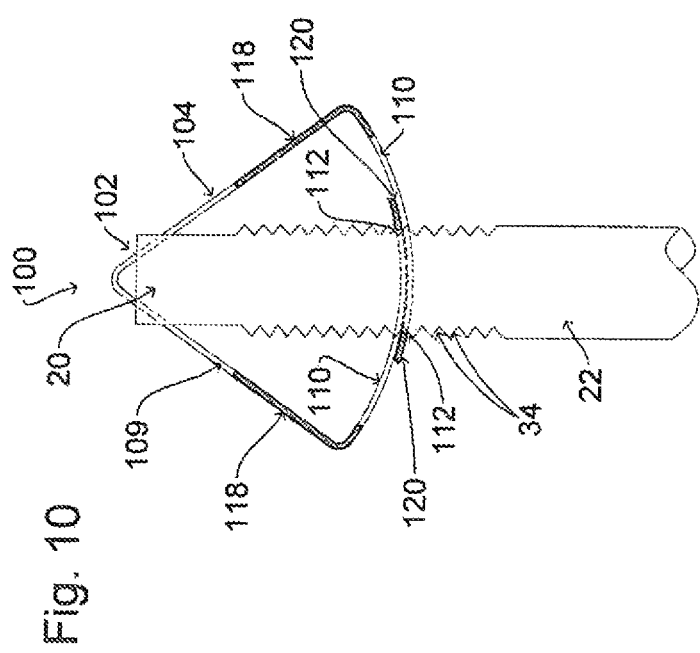

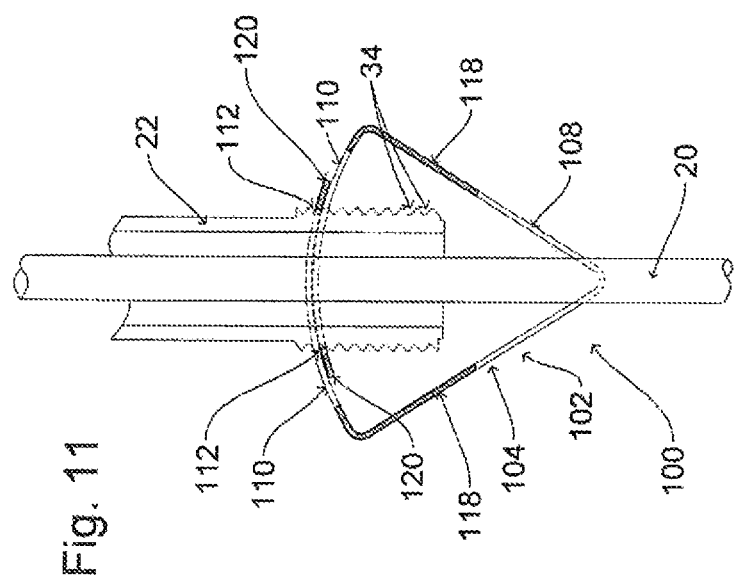

US 9,322,425 B1

INSTRUMENT CLIP

CROSS-REFERENCE TO RELATED APPLICATIONS

This application claims priority from U.S. Provisional Application Ser. No. 61/772,863, filed on Mar. 5, 2013, the entirety of which is expressly incorporated by reference herein.

FIELD OF THE INVENTION

The present invention relates generally to a clip, and more specifically to a clip utilized to hold musical instruments, or parts thereof, on stands.

BACKGROUND OF THE INVENTION

To hold various types of musical instruments on stands, a number of different types of clips have been developed. These clips are designed to securely engage the stand on which the instrument is positioned. The clip operates to hold the instrument on the stand as a result of the engagement of the clip with the stand, while also allowing the instrument to be played without interference from the clip.

While the majority of the clips of this type work adequately well, on significant shortcoming in the designs of each of the clips is the relatively complicated construction of the prior art clips. In particular, these clips often require a number of different components that are attached and moved relative to one another during the engagement and disengagement of the clip from the stand, greatly increasing the cost for the clip, and the time required to properly attach or remove the clip from the stand.

Thus, it is desirable to develop an alternative clip design that securely holds the instruments on the stand, but without the complicated structure found in prior art clips.

SUMMARY OF THE INVENTION

According to one aspect of the present disclosure, a cymbal or instrument clip is provided that is formed of a piece of material having an inherent resiliency or bias. This resiliency enables the clip to securely engage a stand to secure a musical instrument thereto without the need for any additional components to facilitate the engagement of the stand by the clip.

According to another aspect of the present disclosure, the clip includes a number of apertures formed in the clip that are used to engage and release the clip from the stand. The apertures are formed in the clip at locations that can be selectively aligned with one another to enable the stand to be inserted through the apertures, and engaged by the apertures.

According to a further aspect of the present disclosure, the clip can be formed a unitary piece of the material having the inherent resiliency or bias, in order to facilitate the formation of the clip in an inexpensive and efficient manner. Additionally, the unitary structure of the clip enables the clip to be operated in an easy manner to secure and release the clip from the support stand.

Numerous other aspects, features, and advantages of the present disclosure will be made apparent from the following detailed description together with the drawings figures.

BRIEF DESCRIPTION OF THE DRAWINGS

The drawings illustrate the best mode currently contemplated of practicing the present disclosure.

In the drawings:

FIG. 10 is a cross-sectional view of the clip of FIG. 5 secured to a upwardly extending support; and FIG. 11 is a cross-sectional view of the clip of FIG. 5 secured to a downwardly extending support.

DETAILED DESCRIPTION OF THE INVENTION

Figure 1:
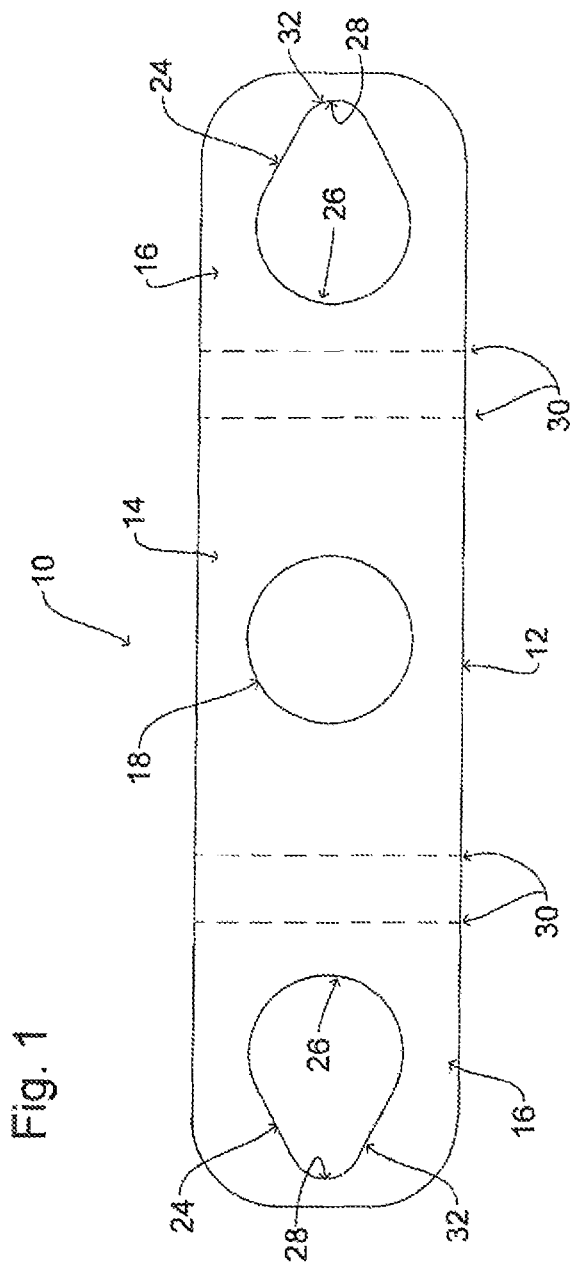
FIG. 1 is a top plan view of a first embodiment of a clip constructed according to the present disclosure in an unfolded position.

Referring now in detail to the drawing figures, wherein like reference numerals represent like parts throughout the several views, one embodiment of an instrument clip constructed according to the present disclosure is illustrated generally at 10 in FIG. 1.

Figure 2:
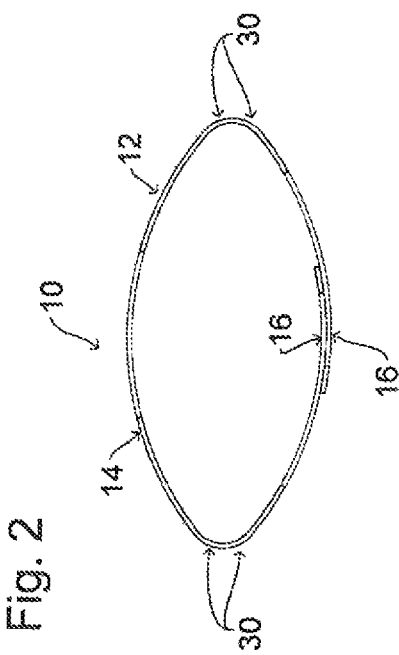
FIG. 2 is a side plan view of the clip of FIG. 1 in an assembled position.
Figure 3:
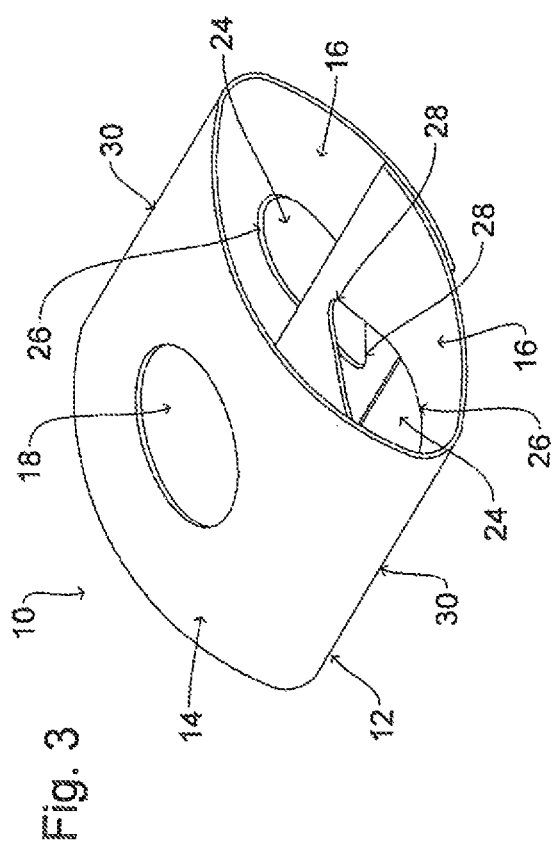
FIG. 3 is an isometric view of the clip of FIG. 2.
Figure 4:
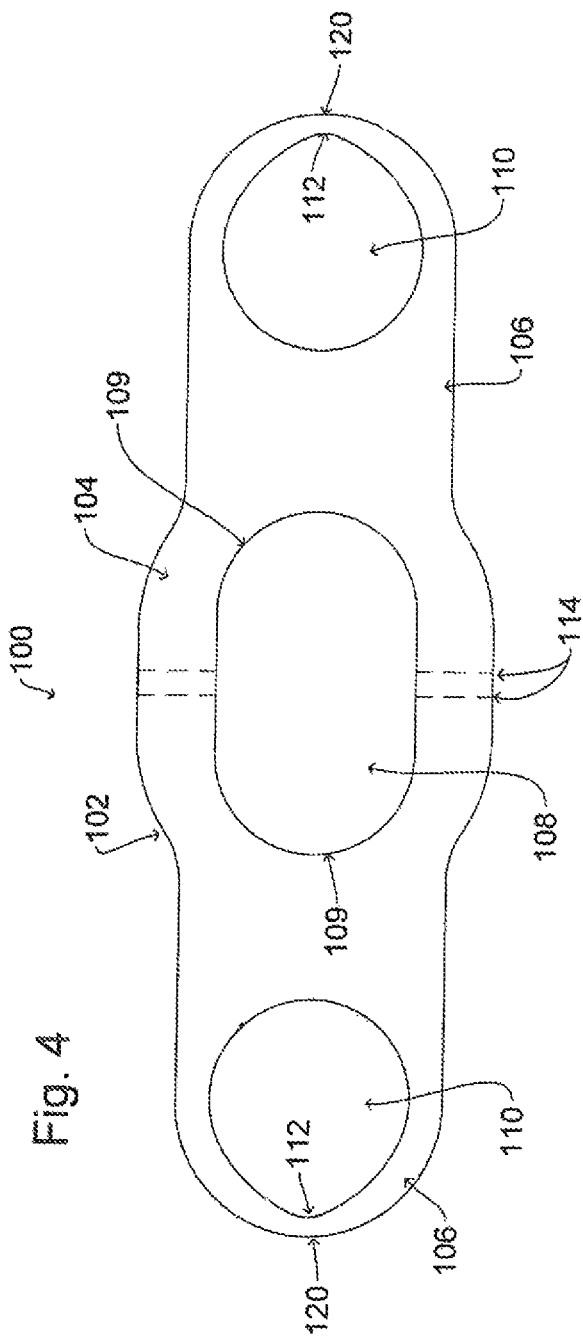
FIG. 4 is an isometric view of a second embodiment of the clip of FIG. 1 in an unfolded position.
Figure 5:
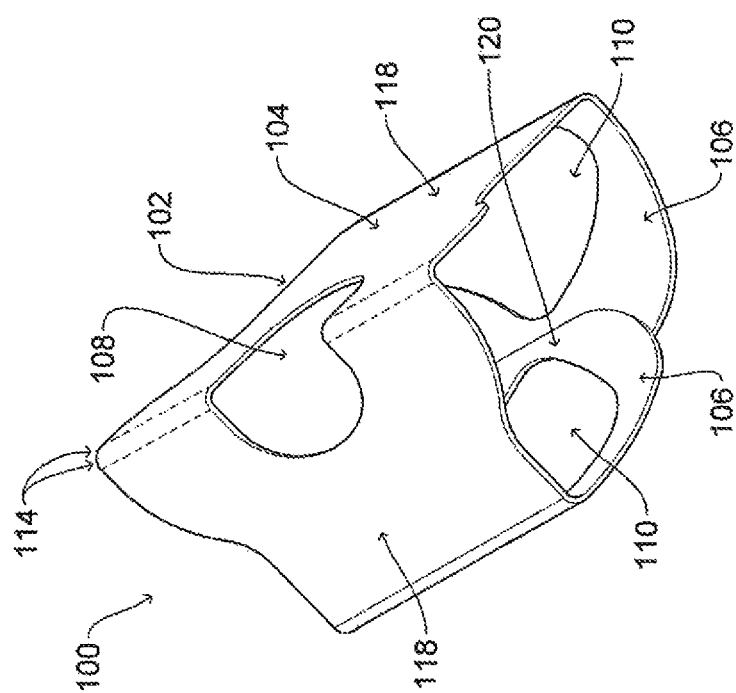
FIG. 5 is an isometric view of the clip of FIG. 4 in an assembled position.

Referring now to FIGS. 1-3, the clip 10 is formed from a piece of a generally rigid, but flexible material, such as a metal or a plastic, having an inherent bias or resiliency. In the illustrated embodiment the clip 10 has a body 12 that is generally rectangular in shape, and includes a central portion 14 with a pair of end portions 16 extending from opposed sides of the central portion 14.

The central portion 14 includes an aperture 18 formed therein. The aperture 18 in the illustrated embodiment is disposed centrally within the central portion 14 and has a diameter sufficient to enable an end 20 of an instrument stand 22 to extend therethrough.

Each end portion 16 is formed with an opening 24 therein which has a wide end 26 located adjacent the central portion 14 and a narrow end 28 located generally opposite the central portion 14. The wide end 26 has a diameter sufficient to enable an end 20 of an instrument stand 22 (FIGS. 10 and 11) to pass therethrough, while the narrow end 28 has a diameter less than that of the wide end 26.

The end portions 16 are separated from the central portion 14 by a number of lines of flexion 30. To form the clip 10, the end portions 16 are each folded inwardly towards the central portion 14 about the one or more lines of flexion 30 in order to position the end portions 16 in an overlapping configuration as shown in FIGS. 2 and 3. In this configuration, the narrow end 28 of each opening 24 in the end portions 16 is located in at least partial alignment with the aperture 18 in the central portion 14, while the wide ends 26 are offset from the aperture 18, as best shown in FIG. 3.

The nature of the material forming the body 12 of the clip 10 enables the end portions 16 to be pressed inwardly towards one another to a position where the wide ends 26 of the openings 24 in each end portion 16 are aligned with the aperture 18 in the central portion 14. In this position, the wide ends 26 of the openings 24 and the aperture 18 allow for the end 20 of the stand 22 to be inserted through the clip 10. When the clip 10 is positioned where desired on the stand 22, the end portions 16 can be released and the inherent resiliency of the material forming the body 12 of the clip 10 causes the end portions 16 to move away from one another. In performing this motion, the narrow ends 28 of each opening 24 become engaged with the stand 22. In the illustrated embodiment, the narrow ends 28 can have tapered inner surfaces or edges 32 that can engage threads 34 disposed on the stand 22. This engagement securely holds the clip 10 in the desired location on the stand 22 until the end portions 16 are again moved towards one another, thereby moving the narrow ends 28 away from the stand 22 and disengaging the narrow ends 28 from the stand 22.

The clip 10 can be used to engage an instrument to an upper end 20 of the stand 22, as in the case of a cymbal (FIG. 10), or to a lower end 20 of a stand 22, as in the case of a hi-hat (FIG. 11).

In a second embodiment of the clip 100, as best shown in FIGS. 4-11, the clip 100 includes a body 102 having a central portion 104 and a pair of outwardly extending end portions 106 positioned on each side of the central portion 104. The central portion 104 is formed with a width greater than that of each of the end portions 106. The central portion 104 includes an elongate aperture 108 with generally circular ends 109 therein, while each of the end portions 106 includes a generally circular opening 110 therein, with each opening 110 having an outwardly extending notch 112 formed in the opening 110 generally opposite the central portion 104.

Figure 6:
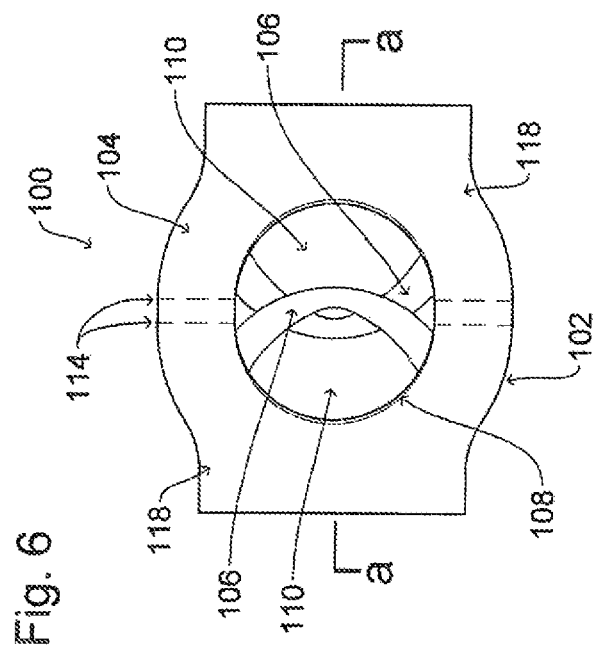
FIG. 6 is a top plan view of the clip of FIG. 5.
Figure 7:
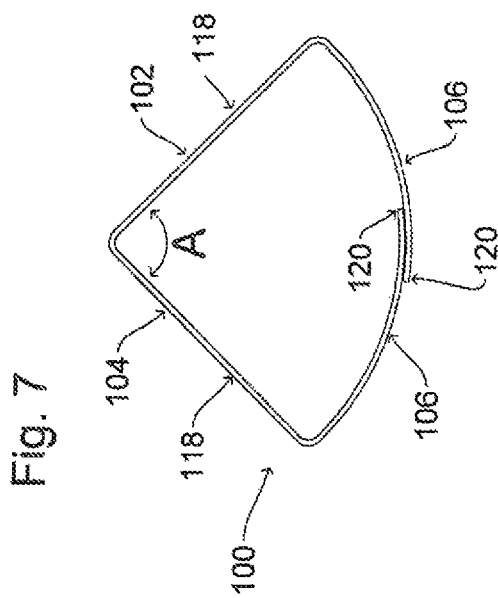
FIG. 7 is a side elevation view of the clip of FIG. 5.
Figure 8:
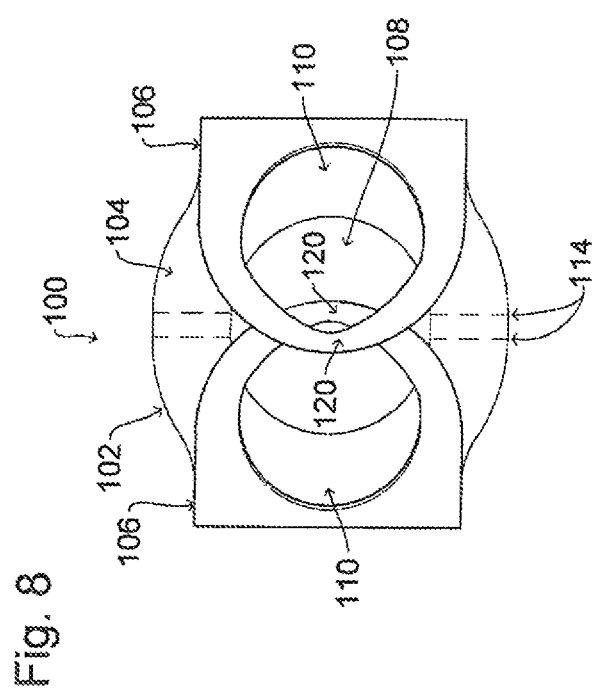
FIG. 8 is a bottom plan view of the clip of FIG. 5.
Figure 9:
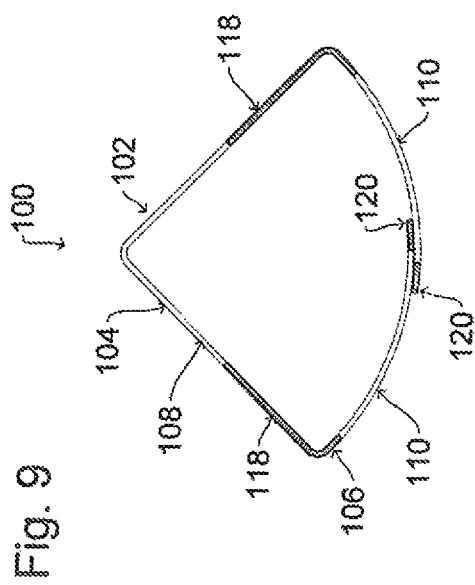
FIG. 9 is a cross-sectional view along line 9-9 of FIG. 6.

Looking now at FIGS. 5-9, the body 102 is assembled into the clip 100 having a generally triangular or wedge cross-section by folding the central section 104 along a centerline 114 or a pair of closely spaced centerlines 114 to position the halves 118 of the central portion 104 at an angle A of between 80 degrees and 100 degrees with respect to one another, with an angle of approximately 90 degrees with respect to one another. In folding the central portion 104, the aperture 108 is deflected to have a generally circular perimeter, as shown in FIGS. 6 and 8, while still being large enough to enable the entire diameter of a stand 22 to pass therethrough (FIGS. 10 and 11).

In addition, each end portion 106 is folded with regard to the halves 118 of the central section 104 to overlap the outer ends 120 of the end portions 106, such that the openings 110 are completely disposed within the parts of the end portions 106 folded with respect to the halves 118 and that the notches 112 are at least partially aligned with one another but the remainder of the openings 110 are offset from one another. The bias of the material forming the body 102 of the clip 100 holds the clip 100 in this position. In addition, the resiliency of the material enables the halves 118 of the central portion 104 of the clip 100 to be pressed towards one another to align the openings 110 with each other to allow the stand 22 to be inserted through the openings 110 and the aperture 108. Once positioned around the stand 22, by removing the force from the halves 118, the resiliency of the material forming the clip 100 moves the halves 118 and the openings 110 away from each other to engage the notches 112 with the threads 34 on the stand 22.

In the illustrated embodiment, the end portions 106 are formed with a curved shape, such that the end portions 106 and the openings 110 are positioned at an angle with regard to the threads 34 on the stand 22. In addition, the end portions 106 can be formed with different shapes other than curved when folded to overlap one another and form the clip 100.

Changes can be made in the above constructions without departing from the scope of the invention, it is intended that all matter contained in the above description or shown in the accompanying drawings shall be interpreted as illustrative and not in a limiting sense. Various other embodiments of the present invention are contemplated as being within the scope of the filed claims particularly pointing out and distinctly claiming the subject matter regarded as the invention.

The invention claimed is:

1. A clip for securing a musical instrument to a stand, the clip comprising:
   a. a central portion having a V-shape that defines a fold along a centerline of the central portion and an elongate V-shaped aperture therein;
   b. a first end portion extending outwardly from the central portion and defining a first opening therein; and
   c. a second end portion extending outwardly from the central portion and defining a second opening therein, wherein the first end portion at least partially overlaps the second end portion such that the first opening is offset from the second opening and wherein the first end portion and the second end portion can be urged towards one another about the fold in the central section to align the first opening and second opening with one another and with the elongate aperture in order to receive the instrument stand.

2. The clip of claim 1, wherein the first opening includes a wide end and a narrow end.

3. The clip of claim 2, wherein the second opening includes a wide end and a narrow end.

4. The clip of claim 3, wherein the narrow end of the first opening at least partially overlaps the narrow end of the second opening.

5. The clip of claim 3 wherein the narrow ends of the first and second openings include a tapered edge.

6. The clip of claim 1, wherein the central portion, first end portion and second end portion are each formed from a unitary piece of material.

7. The clip of claim 6 wherein the unitary piece of material has an inherent resiliency.

8. The clip of claim 1 wherein the aperture is oval in shape.

9. The clip of claim 1 wherein the second end portion extends outwardly from the central portion generally opposite the first portion.

10. The clip of claim 1 wherein the central portion is folded into halves along a centerline of the central portion.

11. The clip of claim 10 wherein the halves of the central portion are positioned at an angle of between 80 and 100 degrees with regard to one another.

12. The clip of claim 1 wherein the first and second end portions have a curved shape.

13. The clip of claim 1 wherein a center of the elongate V-shaped aperture is aligned with the fold.

14. A musical instrument comprising:
   a. a stand having a first end and a second end;
   b. an instrument mounted to the first end of the stand; and
   c. a clip releasably engaged with the first end of the stand adjacent the instrument to hold the instrument on the stand, the clip comprising a central portion having a V-shape that defines a fold along a centerline of the central portion and an elongate V-shaped aperture therein, a first end portion extending outwardly from the central portion and defining a first opening therein and a second end portion extending outwardly from the central portion and defining a second opening therein, wherein the first end portion at least partially overlaps the second end portion such that the first opening is offset from the second opening and wherein the first end portion and the second end portion can be urged towards one another about the fold in the central section to align the first opening and second opening with one another and with the elongate aperture in order to receive the instrument stand through the elongate opening, the first opening and the second opening.

15. The musical instrument of claim 14 wherein the first end of the stand includes threads thereon and wherein the first opening and the second opening each engage the threads on the first end.

16. A method of securing an instrument to an instrument stand, the method comprising the steps of:
   a. providing the clip of claim 1;
   b. urging the first end portion and second end portion towards each other about the fold in the central section to align the first opening and the second opening with one another and with the elongate aperture;
   c. inserting the stand through the aligned first opening and second opening; and
   d. releasing the first end portion and the second end portion to misalign the first opening and the second opening and engage the first opening and the second opening with to an end of the stand adjacent the instrument.

17. The method of claim 16 wherein the step of releasing the first end portion and the second end portion comprises engaging the first opening and the second opening with threads on the end of the stand.

\* \* \* \* \*

UNITED STATES PATENT AND TRADEMARK OFFICE
CERTIFICATE OF CORRECTION

PATENT NO. : 9,322,425 B1
APPLICATION NO. : 14/022812
DATED : April 26, 2016
INVENTOR(S) : William Feldman Page 1 of 1

It is certified that error appears in the above-identified patent and that said Letters Patent is hereby corrected as shown below:

IN THE CLAIMS

CLAIM 16, column 5, line 18, after "with" delete "to".

Signed and Sealed this
Twenty-eighth Day of June, 2016

Michelle K. Lee
*Director of the United States Patent and Trademark Office*